United States Patent
Lo et al.

(10) Patent No.: US 11,267,270 B2
(45) Date of Patent: Mar. 8, 2022

(54) PRINTING DEVICE DOOR SPRING

(71) Applicant: Hewlett-Packard Development Company, L.P., Houston, TX (US)

(72) Inventors: Kevin Lo, Vancouver, WA (US); Tim Roels, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 930 days.

(21) Appl. No.: 16/065,348

(22) PCT Filed: Apr. 12, 2016

(86) PCT No.: PCT/US2016/027144
§ 371 (c)(1),
(2) Date: Jun. 22, 2018

(87) PCT Pub. No.: WO2017/180112
PCT Pub. Date: Oct. 19, 2017

(65) Prior Publication Data
US 2021/0206182 A1 Jul. 8, 2021

(51) Int. Cl.
*B41J 29/13* (2006.01)
*B41J 13/10* (2006.01)
*F16F 1/26* (2006.01)

(52) U.S. Cl.
CPC ............ *B41J 29/13* (2013.01); *B41J 13/106* (2013.01); *F16F 1/26* (2013.01)

(58) Field of Classification Search
CPC ................................ B41J 29/13; B41J 13/106
See application file for complete search history.

(56) References Cited

U.S. PATENT DOCUMENTS

| | | | |
|---|---|---|---|
| 5,494,364 A | 2/1996 | Murakami et al. | |
| 6,575,454 B2 | 6/2003 | Stevens | |
| 7,524,121 B2 | 4/2009 | Namekawa et al. | |
| 8,066,272 B2 | 11/2011 | Dobashi et al. | |
| 8,376,353 B2 | 2/2013 | Hochreiter | |
| 9,272,864 B2 | 3/2016 | Dufort et al. | |
| 2006/0180446 A1 | 8/2006 | Yamada | |
| 2007/0077085 A1 | 4/2007 | Kitamura et al. | |
| 2007/0147882 A1* | 6/2007 | Igarashi | B41J 29/13 399/110 |
| 2008/0122879 A1 | 5/2008 | Nicodem et al. | |
| 2012/0319349 A1 | 12/2012 | Lee et al. | |
| 2014/0203499 A1 | 7/2014 | Lo et al. | |
| 2015/0001794 A1* | 1/2015 | Doi | B65H 1/04 271/264 |

(Continued)

FOREIGN PATENT DOCUMENTS

| | | |
|---|---|---|
| CN | 1542560 A | 11/2004 |
| EP | 1803579 | 7/2007 |

(Continued)

*Primary Examiner* — Matthew Luu
*Assistant Examiner* — Kendrick X Liu
(74) *Attorney, Agent, or Firm* — Fabian VanCott

(57) ABSTRACT

A door for a printing device may include a spring having a first and a second end, the second end coupled to the door and the first end biased away from a surface of the door and a groove into which the first end of the spring may be placed into wherein when the first end of the spring is placed into the groove, the door is deflected in the direction that the spring is biased.

20 Claims, 5 Drawing Sheets

(56) References Cited

U.S. PATENT DOCUMENTS

2016/0024836 A1    1/2016  Shiina

FOREIGN PATENT DOCUMENTS

| JP | 07243278 | | 9/1995 |
| JP | 2006137511 | A | 6/2006 |
| JP | 2011178562 | | 9/2011 |
| JP | 2012174698 | A | 9/2012 |
| JP | 2015102661 | A | 6/2015 |
| KR | 1020060085795 | A | 7/2006 |

* cited by examiner

PRINTING DEVICE DOOR SPRING

BACKGROUND

Printing devices receive image data to a controller associated with the printing device and cause an image to be represented on printing media such as a sheet of paper. The print media, after the image has been printed thereon, may be ejected from the printing device at an output bin. This bin may be a dedicated location on or within the printing device where the output media may rest until a user receives them.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
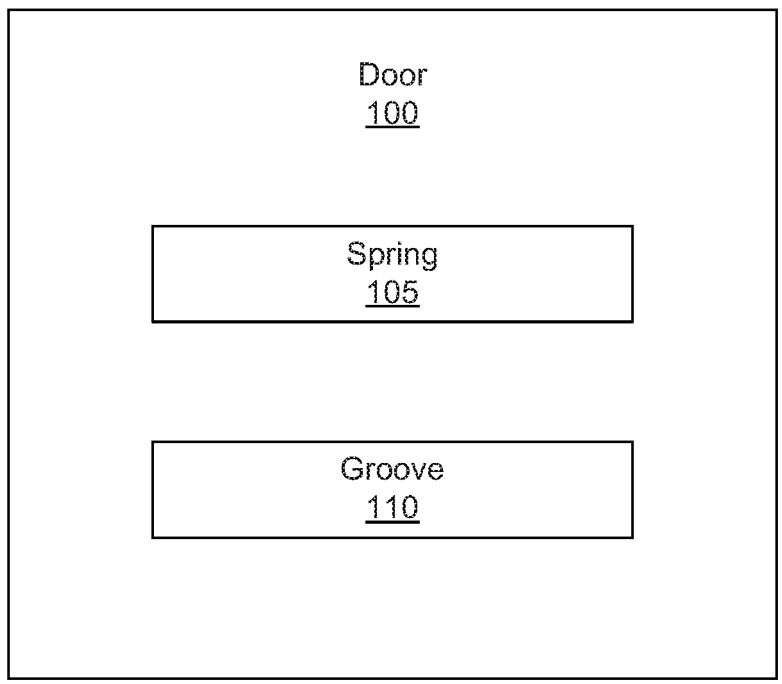
FIG. 1 is a block diagram of a door according to one example of the principles described herein.

As described above, a printing device may include an output bin where printed media may be deposited. As the printed media exits the printing device, certain printing processes may have caused the print media to curl or otherwise not be flat. In some instances, the housing of the printing device may catch an end of the print media as it exits the printing device causing jamming or misalignment of the printed media. One location where the print media may catch the housing of the printing device is at an interface between a service door and the output bin. In an example, certain characteristics of the service door including the way the service door is hung and the physical attributes of the material that make the door may cause the door to extend higher than a surface of the output bin. In this case, the printed media may strike the door and be misaligned from other sheets of printed media on the output bin. Additionally, in an example, certain characteristics of the service door including the way the service door is hung and the physical attributes of the material that make the door may cause the door to extend lower than a surface of the output bin. In this case, creases or curl in the printed media may cause the printed media to get caught in a gap defined between the output bin and the door. In an example, the printed media may actually slip into an opening created by the output bin/service door interface, causing the printed media to slip back into the printing device or get caught in that interface.

In order to prevent misalignment of the printed paper or jamming of the printed paper, the present specification describes a spring coupled to an interior surface of the service door. The spring may be coupled, at a first end, to the interior surface of the door via a groove defined on the interior surface of the door. A second end of the spring may be biased towards the interior of the printing device while the service door is closed. The second end of the spring may be coupled to the interior surface of the door via, for example, a number of posts and screws as described herein. Because of the bias of the spring, the door may be deflected inward and slightly down to prevent printed paper from entering in between the output bin/service door interface or catching on, at least, an upward protruding portion of the service door.

The present specification, also describes a door for a printing device including a spring having a first and a second end, the second end coupled to the door and the first end biased away from a surface of the door, and a groove into which the first end of the spring may be placed into wherein when the first end of the spring is placed into the groove, the door is deflected in the direction that the spring is biased.

The present specification further describes a printing device including a media output bin and a door downstream of the media output bin running perpendicular to the media output bin, the door including a flat spring including a first end placed within a groove defined on the surface of the door and a second end coupled to the surface of the door.

The present specification additionally describes a method of manufacturing a printing device door, including fitting a first end of a spring into a groove formed on an interior surface of the printing device door, a second end of the spring biased away from the interior surface of the printing device door, and coupling a second end of a spring to an interior surface of the printing device door.

As used in the present specification and in the appended claims, the term "printing device" is meant to be understood broadly as any device that applies a printing fluid to a print media.

Even still further, as used in the present specification and in the appended claims, the term "a number of" or similar language is meant to be understood broadly as any positive number comprising 1 to infinity.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Turning now to the figures, FIG. 1 is a block diagram of a door (100) according to one example of the principles described herein. The door (100) may be made of any material. In an example, the door (100) is made of a preformed plastic material. In an example, the material making the door (100) may be elastic allowing the shape of the door (100) to be changed by force but returned to an original shape when the force acting on it is either opposed or not applied to the material. As will be described in more detail below, the door (100) may be slightly deformed through the use of a spring (105) but may be returned to an un-deformed or relatively less deformed state when the door is closed against another portion of the housing of the printing device.

The spring (105) may be any type of spring that can impart a force against an inner wall or surface of the door (100). In an example, the spring (105) is made of metal. In an example, the spring (105) is a leaf spring that is coupled to the interior surface of the door (100) at two separate locations. In this example, a first end of the spring (105) is coupled to a first location on the interior surface of the door (100). A second end of the spring (105) may be coupled to a second location on the interior surface of the door (100). In an example, the second end of the spring (105) is at a relatively center interior portion of the door (100) below the first end of the spring (105). The first end of the spring (105) is coupled to a top interior portion of the door (100) via, for example, a groove (110). In this example, the spring (105) may have a biased force directed away from the interior surface of the door (100) and into the printing device when the door (100) is in a closed position.

The groove (110) may be any feature on the interior surface of the door (100) that maintains the first end of the spring (105) against the interior surface of the door (100). In an example, the groove (110) is formed out of the material of the door (100) and is formed at the time the door (100) was formed. In this example, the door (100) and groove (110) may be made simultaneously in, for example, a compression mold. In an example, the groove (110) may be created by coupling a piece of material to the interior surface of the door (100) such that the material runs parallel to the interior surface of the door (100) and leaves a gap between the material and the door (100) providing a place into which the first end of the spring (105) may be placed.

As described above, as the second end of the spring (105) is coupled to the interior surface of the door (100) and the first end of the spring (105) is placed in the groove (110), this causes a top portion of the door (100) to bend inward a distance due to the force placed on the door (100) by the spring (105) and a flex modulus of the material of the door (100). The flex modulus of the door (100) may be relatively weak in the direction the spring (105) is pulling. When the door (100) is closed, the top portion of the door (100) may interface with the housing of the output bin of the printing device. This will decrease the gap formed between the top portion of the door (100) and the output bin. Additionally, the bending of the top portion of the door (100) causes the height of the door (100) to decrease. Consequently, the top portion of the door (100) will not protrude above the output bin of the printing device. In an example, the top portion of the door (100) matches the height of a top surface of the output bin. Because the door (100) is bent in this way by the spring (105), printed media will not catch anywhere along the door (100)/output bin interface. As a result, the printed media will not be misaligned in the output bin and will not otherwise be disorganized or damaged when being deposited in the output bin.

Figure 2:
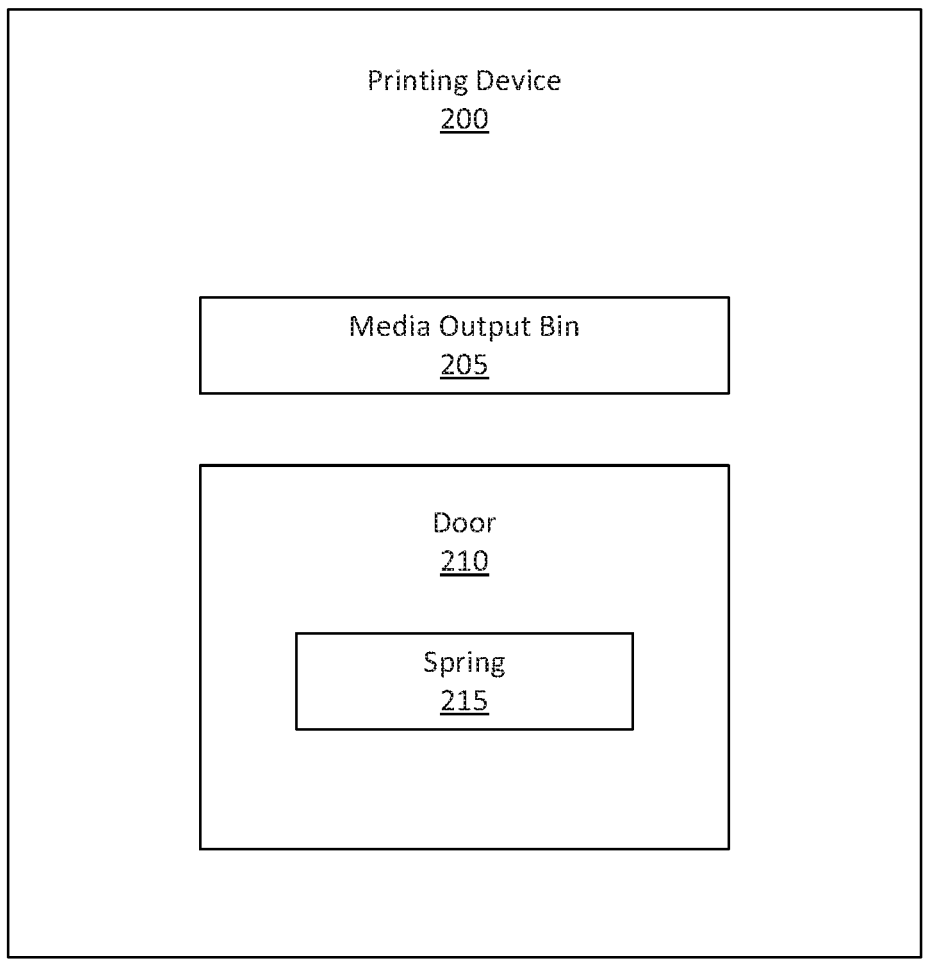
FIG. 2 is a block diagram of a printing device according to one example of the principles described herein.

FIG. 2 is a block diagram of a printing device (200) according to one example of the principles described herein. As described above, the printing device (200) may include a media output bin (205) and a door (210). The media output bin (205) may be a dedicated portion of the printing device (200) where printed media is received after an image has been placed on it. The media output bin (205) receives multiple sheets of printed media when a print job includes multiple sheets to be printed. In this example, these sheets can be arranged on the media output bin (205) such that they are organized and neatly stacked for receipt by a user. As described above, however, the interface between the media output bin (205) and the door (210) may cause any number of these sheets of printed media to be misaligned with the rest of the sheets or get caught at the media output bin (205)/door (210) interface. A spring (215) is used to adjust the height of the door (210) as well as to adjust the distance a top portion of the door (210) interfaces with the media output bin (205).

The spring (215) is coupled at a first and second end to the interior of the door (210). The second end of the spring (215) may be coupled to the door (210) at a central point along the interior surface of the door (210). The first end may be coupled to the interior surface of the door (210) at a top portion of the door (210). The first end of the spring (215) may fit into a groove defined on the door (210). Once the first end of the spring (215) is placed in the groove, the bias of the spring (215) may cause the top portion of the door (210) to bend inward as the second end is coupled to the interior of the door (210). When the door (210) is closed, the top portion of the door (210) interfaces with the media output bin (205). At the media output bin (205)/door (210) interface, the bias of the spring (215) causes the top portion of the door (210) to relatively more closely abut the media output bin (205) than if the spring (215) were not present. Additionally, because the door (210) has been bent slightly inwardly, the height of the door (210) is slightly reduced preventing the top portion of the door (210) from rising above the plane created by the media output bin (205). In an example, the offset between the height of the media output bin (205) and the door (210) is between 0 and 0.6 mm. Both of these features prevent a printed sheet of media from catching on a portion of the door (210) and being aligned or otherwise damaged as they exit the printing device. In an example, the spring is a flat spring made of stainless steel.

In an example, a number of guide ribs may be placed between the media output bin (205) and the top portion of the door (210). The guide ribs may be formed on the surfaces where the media output bin (205) and door (210) abut or may be coupled to the surfaces where the media output bin (205) and door (210) abut. The guide ribs may ensure that the door (210) with respect to the media output bin (205) is always vertically aligned such that the door (210) sits nominally at approximately 0.5 mm (±0.1 mm) below the media output bin (205). The width of the seam or gap created by the media output bin (205) and the door (210) may range from 0 to 0.1 mm. This will make it relatively difficult for printed paper that is 0.1 mm thick to catch an edge of the door (210) and be misaligned or enter in the seam created at the media output bin (205)/door (210) interface.

The use of the spring (215) as described above further compensates for any heat or warping damage that may occur to the printing device (200) during use. Some plastics used to form the housing of some printing devices (200) may be deformed as they are heated by, for example, the sun rays or other sources of external heat. The spring (215) may cause constant bias on the housing portions of the printing device (200) and especially on the body of the door (210) preventing or compensating for such warpage.

Figure 3:
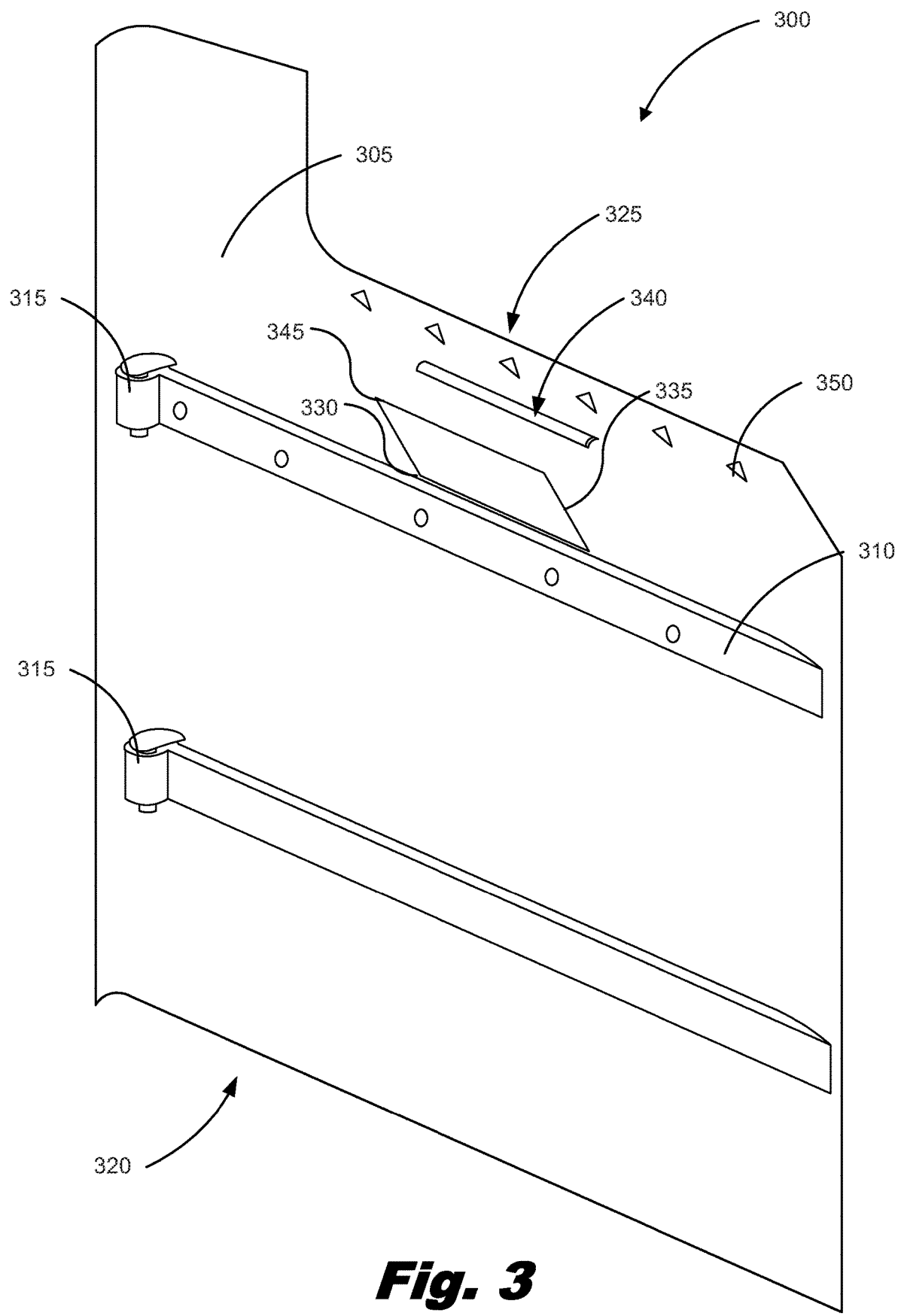
FIG. 3 is a perspective view of a door of a printing device according to one example of the principles described herein.

FIG. 3 is a perspective view of a door (300) of a printing device according to one example of the principles described herein. The door (300) may include a body (305) forming a part of the housing of the printing device, and a frame (310). The frame (310) may also include a number of hinges (315) that allow the door (300) to be coupled to the remainder of the printing device and allow the door (300) to pivot on one side. The interior surface (320) of the door (300) may face the interior of the printing device when the door (300) is closed.

At the top portion (325) of the door (300), a groove (340) may be formed. As the spring (335) is installed, a first end (345) of the spring (335) is placed in the groove (340). As shown in FIG. 3, the first end (345) of the spring (335) is not yet installed in the groove (340) and instead the spring (335) is shown to have an inward bias away from the interior surface (320) of the door (300).

At some location away from a top portion (325) of the interior surface (320) of the door (300), a second end (330) of a spring (335) may be coupled to the door (300). The second end (330) may be coupled directly to the body (305) of the door (300) or may be coupled to some portion of the frame (310) of the door (300). In the example shown in FIG. 3, the second end (330) is coupled to the body (305) of the door (300) between the body (305) and the frame (310). The frame (310) may provide mechanical support sufficient to overcome the biasing force caused by the spring (335) when the spring (335) is installed. During installment of the first end (345) of the spring (335) into the groove (340), the bias of the spring (335) is overcome and a force is exerted onto the top portion (325) of the door (300) causing the top portion (325) of the door (300) to bend inward a distance. As the door (300) is closed against the surface of the media output bin as described above, the deflection of the door (300) due to the spring (335) may be slightly overcome and the seam created between the door (300) and the media output bin may be closed.

As described above, a number of guide ribs (350) may be formed on the top portion (325) of the door (300). The guide ribs may ensure that the door (300) with respect to the media output bin is always vertically aligned such that the door (300) sits nominally at approximately 0.5 mm (±0.1 mm) below the media output bin.

Figure 4:
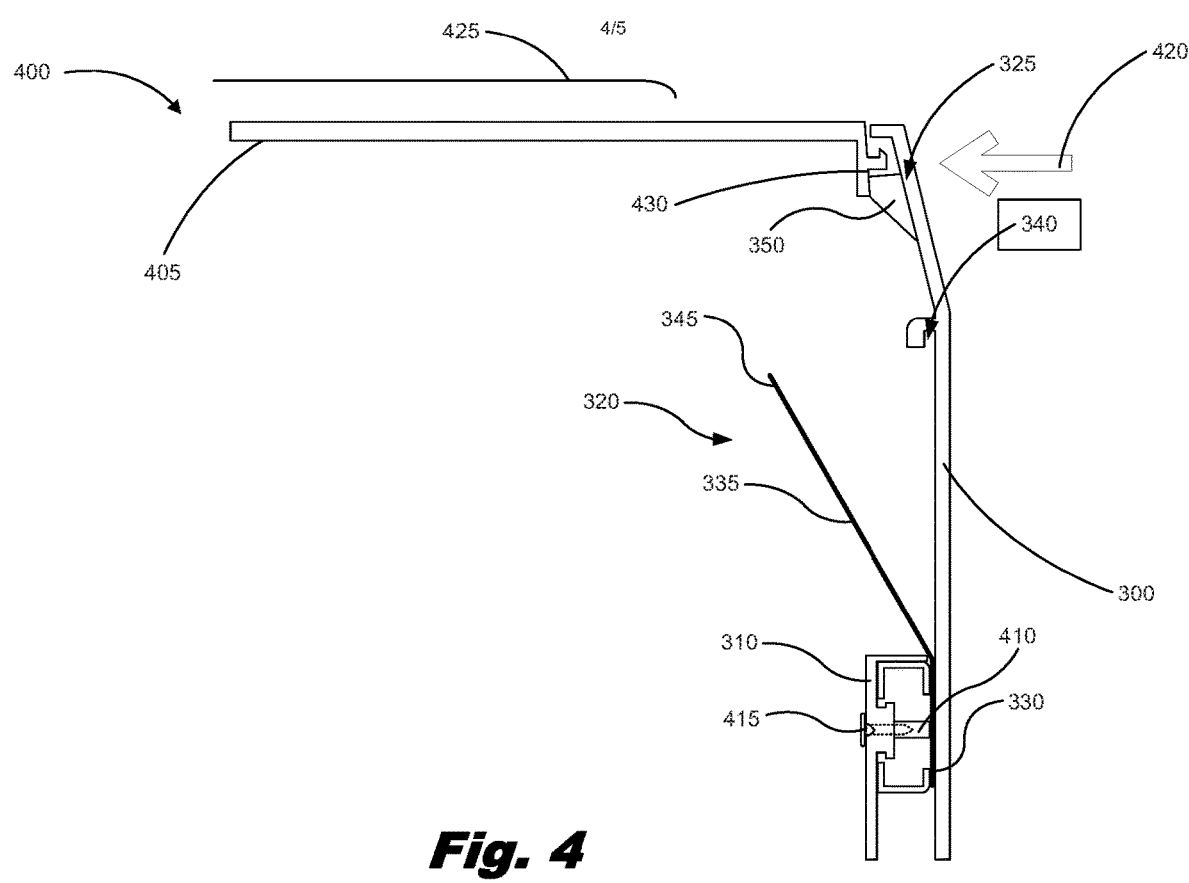
FIG. 4 is a side cutout view of the interface between the media output bin and door of a printing device according to one example of the principles described herein.

FIG. 4 is a side cutout view of the interface between the media output bin (405) where a number of printed sheets of media (425) and door (300) of a printing device (400) according to one example of the principles described herein. With reference to FIG. 3 as well, the second end (330) of the spring (335) may be coupled to the interior surface (320) of the door (300) where the door (300) and frame (310) interface. As can be seen in FIG. 4, the door (300) may include a number of posts (410) which pass through a number of holes defined in the second end (330) of the spring (335). The frame (310) of the door (300) may be placed over top of the posts (410). The posts (410) may further include screw mounts defined coaxially with the posts (410). After the frame (310) is placed over the posts (410), a number of screws (415) may couple the frame (310) to the door (300) while also causing the frame (310) to secure the spring (335) in between the frame (310) and the door (300). This secures the second end (330) of the spring (335) in place.

As described above, the first end (345) of the spring (335) is place within the groove (340) defined on interior surface (320) of the door (300). Because the bias force of the spring (335) is overcome when placing the first end (345) of the spring (335) in the groove (340), the force is now applied to the door (300) causing a top portion (325) of the door (300) to bend in slight in the direction indicated by the arrow (420). This causes the top portion (325) of the door (300) to more closely abut the surface of the media output bin (405).

The shape of the door (300) may change based on whether the door is in a closed position as seen in FIG. 4, or in an open position as seen in FIG. 3. When the door (300) is closed, the spring (335) pulls the body (305) inward to make a good seal with little or no gap formed between the door (300) and the media output bin (405). When the door (300) is opened the body (305) of the door (300), or at least a top portion (325) of the body (305) of the door (300), may move inward relatively more than when closed.

As briefly described above, a number of magnets may be used to decrease the gap formed between the media output bin (405) and door (300) with or without the use of the spring (335) described herein. The magnets may be placed along a seam formed by the media output bin (405) and the door (300) and may provide additional force to close the gap defined thereby.

In an example, the spring (335) may be disassembled from the door (300) by unscrewing the screws (415) from the posts (410) and removing the frame (310) from the door (300). As this is done, the second end (330) of the spring (335) may be slid off of the posts (410) and the first end (345) of the spring (335) may be removed from the groove (340). Consequently, if the spring (335) were to have lost its bias force to any degree, a new spring (335) may be coupled to the door (300) as described above.

FIG. 4 further shows a vertical alignment feature (430) defined on the printing device (400). In this example, the alignment feature (430) may be a portion of the printing device (400) that provides a location on the printing device (400) where the guide ribs (350) may abut. In an example, the guide ribs (350) may be formed on the vertical alignment feature (430) and may be formed to vertically align the door (300) when the door (300) is in a closed position.

Figure 5:
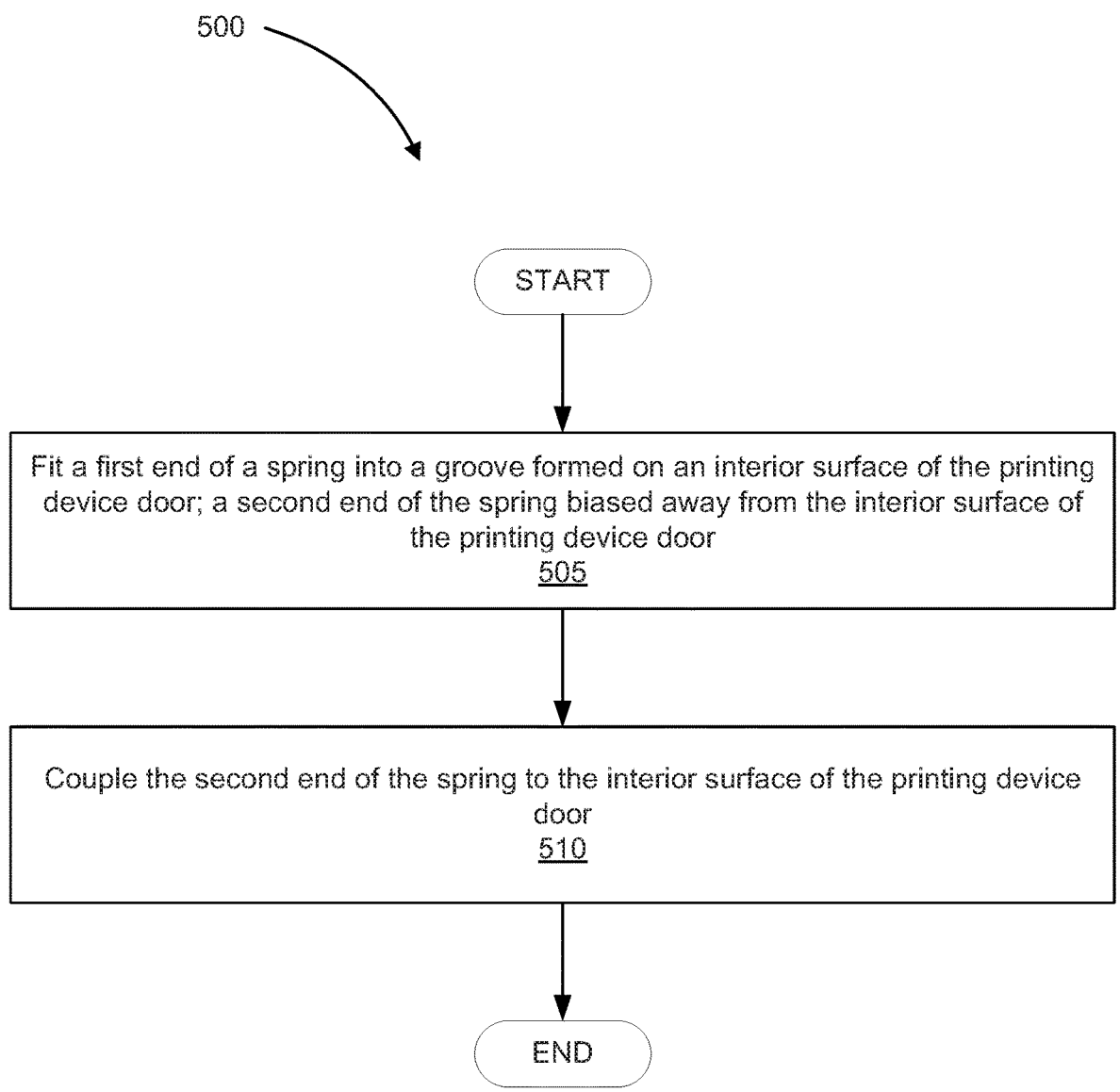
FIG. 5 is a flowchart showing a method of manufacturing a printing device door according to one example of the principles described herein.

FIG. 5 is a flowchart showing a method (500) of manufacturing a printing device (FIG. 4, 400) door (FIGS. 3 and 4, 300) according to one example of the principles described herein. The method (500) may begin with fitting (505) a first end (FIG. 3, 335) of a spring (FIG. 3, 330) into a groove (FIGS. 3 and 4, 340) formed on an interior surface (FIGS. 3 and 4, 320) of the printing device (FIG. 4, 400) door (FIGS. 3 and 4, 300). In an example, a second end (FIG. 3, 335) of the spring (FIG. 3, 330) may be biased away from the interior surface (FIGS. 3 and 4, 320) of the printing device (FIG. 4, 400) door (FIGS. 3 and 4, 300).

The method (500) may continue with coupling (510) the second end (FIG. 3, 330) of the spring (FIG. 3, 330) to the interior surface (FIGS. 3 and 4, 320) of the printing device (FIG. 4, 400) door (FIGS. 3 and 4, 300). As described above, the spring (FIG. 3, 330) may be coupled to the door (FIGS. 3 and 4, 300) via a number of posts (FIG. 4, 410). The frame (FIGS. 3 and 4, 310) is placed over the posts (FIG. 4, 410), a number of screws (FIG. 4, 415) may couple the frame (FIG. 3, 310) to the door (FIGS. 3 and 4, 300) while also causing the frame (FIG. 3, 310) to secure the spring (FIG. 3, 330) in between the frame (FIG. 3, 310) and the door (FIGS. 3 and 4, 300). As described above, this causes the spring (FIG. 3, 330) to force the top of the door (FIGS. 3 and 4, 300) inward under the force imposed by the spring (FIG. 3, 330).

The specification and figures describe a door for a printing device and a method of manufacturing the door. The use of the spring with the door provides for a service door on a printing device that prevents printed media from catching between the media output bin and the door. The spring is also a relatively low cost and takes up little space within the printing device. The cosmetic appearance of the seam created by the door and media output bin is also maintained providing for better user appeal. With the tighter seam produced between the door and the media output tray, air from the dryer of the printing device may be prevented from exiting the printing device. Additionally, with the tighter seam produced between the door and the media output tray, acoustic noise produced by the internal workings of the printing device is reduced improving user satisfaction. Additionally, the implementation of the spring as described herein prevents the door from rattling against the media output bin during operation of the printing device.

The preceding description has been presented to illustrate and describe examples of the principles described. This description is not intended to be exhaustive or to limit these principles to any precise form disclosed. Many modifications and variations are possible in light of the above teaching.

What is claimed is:

1. A door for a printing device, comprising:
a spring having a first and a second end, the second end coupled to the door and the first end biased away from a surface of the door; and
a groove into which the first end of the spring is engaged;
wherein when the first end of the spring is placed into the groove, the door is deflected in a direction that the first end of the spring is biased.

2. The door of claim 1, wherein the deflection of the door is greater when the door is open than when the door is closed against the printing device.

3. The door of claim 2, wherein the door further comprises a number of door offsets to maintain the door a predetermined distance from the printing device when the door is closed against the printing device.

4. The door of claim 3, wherein the door maintains between a 0 to 0.1 mm gap between the door and a surface of the printing device when the door is closed against the printing device.

5. The door of claim 1, wherein the door is made of a resilient material that deflects under the biased force from the spring.

6. The door of claim 1, wherein the spring is a leaf spring.

7. The door of claim 1, wherein the groove is integrally formed in material of the door.

8. The door of claim 1, wherein the groove is located between the surface of the door and a piece of material coupled to the surface of the door.

9. A printing device, comprising:
a media output bin; and
a door downstream of the media output bin running perpendicular to the media output bin, the door comprising:
a flat spring comprising a first end placed within a groove defined on a surface of the door and a second end coupled to the surface of the door.

10. The printing device of claim 9, wherein the flat spring has a bias to pull a portion of the door towards an end of the media output bin.

11. The printing device of claim 10, wherein the portion of the door is a top portion of the door closest to a surface of the media output bin.

12. The printing device of claim 11, wherein the door is pulled towards the end of the media output bin creating a gap between the media output bin and the door less than 0.1 mm.

13. The printing device of claim 11, further comprising a number of magnets coupled to the top portion of the door closest to the surface of the media output bin.

14. The printing device of claim 9, wherein the flat spring is made of stainless steel.

15. The printing device of claim 9, wherein the door further comprises a number of guide ribs between the media output bin and the door to align the door with the media output bin.

16. The printing device of claim 9, wherein, when the door is closed, a portion of the door abuts the media output bin such that some deflection of the door due to bias of the flat spring is overcome.

17. A method of manufacturing a printing device door, comprising:
fitting a first end of a spring into a groove formed on an interior surface of the printing device door, the first end of the spring biased away from the interior surface of the printing device door to exert force to deflect and bend a portion of the printing device door at the groove in a direction of the spring bias; and
coupling a second end of the spring to the interior surface of the printing device door.

18. The method of claim 17, wherein coupling the second end of the spring to the interior surface of the printing device door comprises:
forming a number of holes in the second end;
mating the number of holes with a number of posts formed on the printing device door; and
coupling a fastener to the posts securing the spring to the interior surface of the printing device door.

19. The method of claim 18, wherein the fastener is a metal frame of the printing device door.

20. The method of claim 17, further comprising installing the printing device door in a printing device, wherein, when the door is closed, a portion of the printing device counters some of the deflection of the printing door due to the bias of the spring.

* * * * *